Feb. 7, 1961          J. D. RIESER          2,970,493

VARIABLE RATIO TRANSMISSION MECHANISM

Filed Nov. 3, 1958          3 Sheets-Sheet 1

INVENTOR.

BY *John D. Rieser*

INVENTOR.
BY John D. Rieser

United States Patent Office 2,970,493
Patented Feb. 7, 1961

2,970,493
VARIABLE RATIO TRANSMISSION MECHANISM
John D. Rieser, 369 Pine St., San Francisco, Calif.
Filed Nov. 3, 1958, Ser. No. 771,255
12 Claims. (Cl. 74—230.17)

This invention relates to a motorized and a motorized-geared variable ratio transmission mechanism, more particularly to a V-belt variable speed drive including a housing having a fluid lubricant inclosure and having operable mounting means for a drive motor and a pair of shafts in spaced parallel relationship extending beyond the inclosure and mounting variable effective diameter pulleys in opposed cooperative positions, with an endless V-belt in driving relationship thereto to transmit power from one shaft to the other shaft at variable speeds. The pulleys comprising a pair of sections having opposed inclined belt engaging faces and forming, by axial adjustment variable effective diameters to vary the drive ratio by a control means operably mounted within the inclosure and having externally, a speed indicator means and actuating means. And the shaft being driven by the belt having internally, means for operably connecting thereto a desired power takeoff and a power input shaft for a speed change gearing.

In the present instance, the motor rotor is mounted onto the driving shaft of the variable speed drive. A variable effective diameter pulley is mounted onto this driving shaft, and its effective diameter is connected by a V-belt with the effective diameter of a similar pulley on the driven shaft or load driving shaft. And as each of the pulleys includes a pair of sections having opposed inclined faces which are axially adjustable toward and away from each other, in that as the sections move together, the belt in active driving relationship with both of the inclined faces, is moved by the sections radially outwardly, thereby increasing the effective diameter. And reversely as the sections move away from each other, the belt in active driving relationship with both inclined faces, moves radially inwardly, thereby decreasing the effective diameter. These axial adjustments at each of the pulleys are of correlative amount and controlled by the control means, thereby maintaining the active driving relationship of the V-belt therewith the inclined faces of the sections through entire range of speed adjustments.

In my prior application #643,870, dated March 4, 1957, now Patent #2,871,715, I have disclosed a similar variable ratio transmission mechanism, in which a part of its control means is disposed within a fluid inclosure. However, it does not include a speed indicator and the shaft being driven by the belts does not include an internal means for operably connecting thereto of a desired power takeoff and a desired input shaft for the speed change gearing and other novel features as will be seen.

An object of the present invention is to provide an improved variable ratio transmission mechanism of the V-belt character including a housing having a fluid inclosure with a fluid lubricant therein, and operably mounting means for a pair of shafts and within the inclosure at least one of the shafts being operably connected to a propulsion means so that upon operation of the mechanism it propels part of the fluid above the normal level of the fluid pool thereby cause wetting of portions of a control means and an indicator means disposed therein.

Another object of the present invention is to provide in the above wherein each of the shafts extends through corresponding spaced openings in an end wall of the inclosure in adjacency to the pulleys, and each opening supportedly mounting a seal adaptor, and intermediate of the shafts each adaptor having a projection extending toward one another, and provide a spaced pair of abutment connections, for corresponding ends of a control unifying element. And wherein these abutment connections within the inclosure formed to provide of a movement of the unifying element in direction parallel to the longitudinal axis of the shafts while maintaining its rectangularity relative to the axes of the shafts.

Another object of the present invention is to provide in the above wherein the housing externally beyond the inclosure having an extension extending cantilever fashion intermediate of the shafts and at its free end extending transversely and provide journalling support for the outward ends of both shafts. A takeup stud extending through the extension with its inner end screw thread connected to the unifying element while having its head fixedly disposed for rotation within the free end of the extension, whereby upon rotative actuation of the stud for belt takeup purposes causing said movement.

Another object of the present invention is to provide of a first transverse pin extending through the walls of a hub member that extends into the inclosure being disposed so that its edges remain therein through the range of axial adjustment of the pulley section, while the edges of a second transverse pin extending through the walls of a hub member at its telescopic connection, remains within the telescopic range of the telescopic connection, thereby maintain the respective slidable sealing surfaces of these hub members at each of the shafts.

Another object of the present invention is to provide a series of fluid lubricant channels, formed by the gear pinion having a pair of projections of diameter to coincide with the root diameter of its gear teeth and the pair of mating racks each having a pair of notches disposed to correspond with the diameter and length of the projections, whereby upon the pair of racks and pinion within a bore in each of the shafts when in telescopic position, forms a series of channels extending from opposite end of the head portion of the racks, thereby providing fluid passages at the perimeter of the bore in each instance.

Another object of the present invention is to provide on each shaft, a pair of oppositely disposed splines having a transverse width, whereby the shaft pin for the gear pinion remains within range of said transverse width while extending therethrough. And the shaft pin having substantially an external surface of uniform diameter.

Another object of the present invention is to provide means for attaching rigidly, but renewably a power takeoff shaft or input shaft for a speed change gearing within an end of the variable speed shaft of a variable speed drive, by providing therein a taper bore for a corresponding split tapered bushing and internally beyond the taper bore the variable speed shaft having a shoulder means for engaging a cooperative head of the power takeoff shaft and power input shaft of the speed change gearing.

Another object of the present invention is to provide in the above a mechanical means for fluid lubrication of the metal to metal actuating parts of the variable ratio transmission mechanism by providing a series of apertured means extending from within the inclosure and beyond and return to within the inclosure, and of which the series of channels within the bore therein each of the shafts forms a part.

This invention possesses other advantages and has other objects which may be more easily apparent from consideration of the several embodiments of the invention. For this purpose there are outlined several forms.

These forms will now be described in detail to illustrate the general principles of the invention, but it is to be understood that this detailed description is not to be taken in a limiting sense as the same is susceptible of modification without departing from the spirit or scope of the invention which is broadly set forth in the appended claims.

Figure 1:
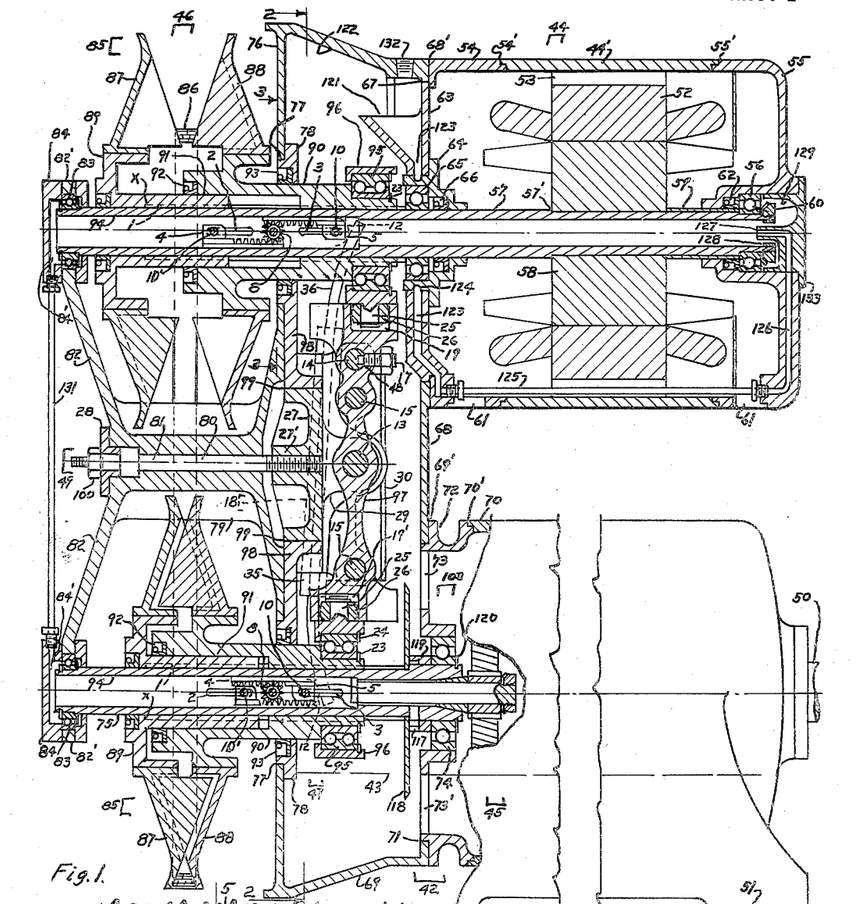
Figure 1 is an elevation view partly in section.
Figures 2, 7:
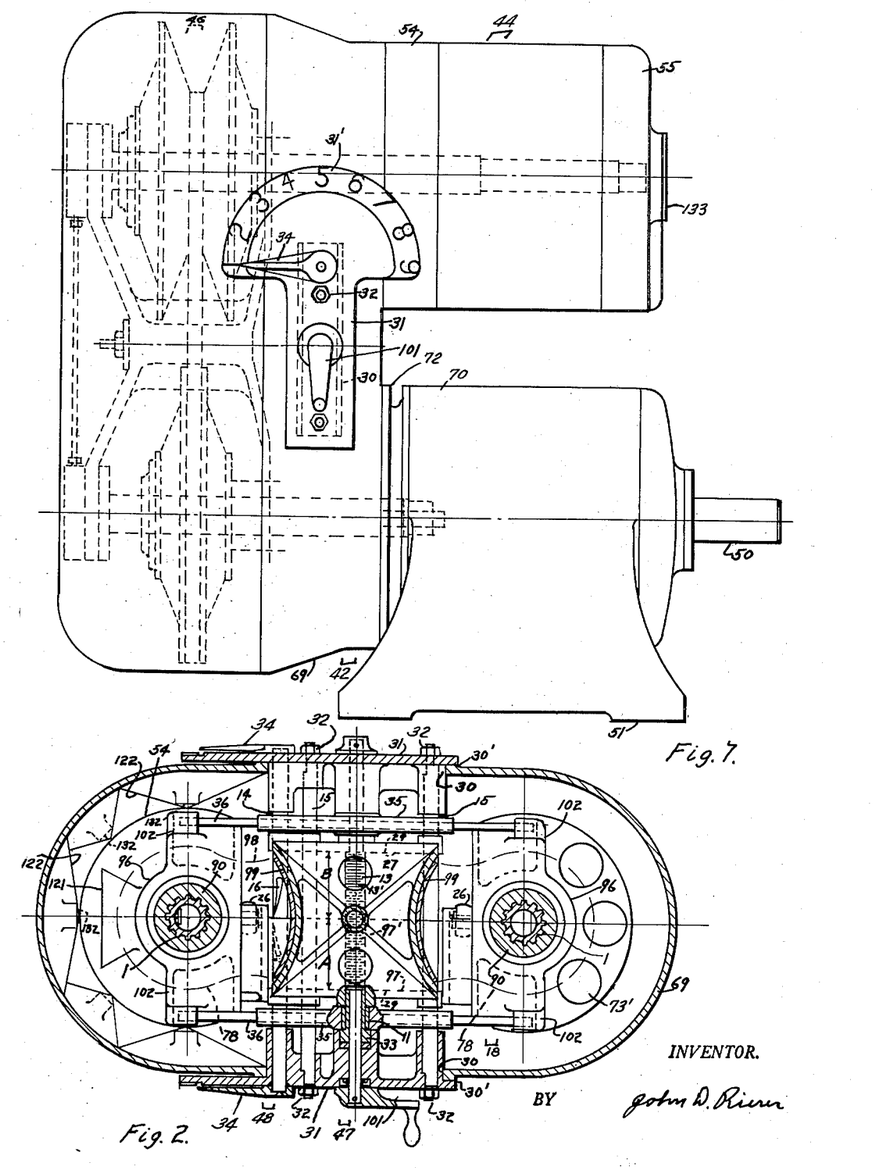
Figure 2 is a cross-section view to reduced scale partly in section taken generally on the line 2—2 Figure 1, but broken to show the locking means for locking in place of a takeup adjustment and a journalling of the lead screw and the indicator stem extending through and beyond the scale bracket.
Figure 7 is an external elevation view to reduced scale similar to the Figure 1, with the exception that it shows the inclusion of a sheet metal hood. And its inclusion is optional, being shown merely to form a finish appeal. And therein by means of dotted lines indicating generally the variable effective diameter pulleys and the cantilever extension of the frame or housing.

Referring to the drawings, and more particularly to the Figures 1, 2 and 7, the variable ratio transmission mechanism or unit, generally comprises a housing 41 having a fluid inclosure 42 with a fluid lubricant 43 therein, a driving electric motor 44, a speed change gearing 45 extending to the fluid 43 and the variable ratio mechanism 46, disposed externally beyond the inclosure 42, of which the numeral 47 indicates the control means with its indicator means 48 portions of which being disposed within the inclosure 42, and the takeup means 49 extending from within the inclosure. The variable ratio mechanism 46 providing a variable speed drive between the motor and the speed change gearing 45, as will be seen. The speed change gearing having a power output shaft 50 and the numeral 51 designates the base for the unit.

The motor 44 Figure 1, is of the round frame footless type having desired electrical characteristics, of which its frame 44′ mounts in regular manner the stator and coils, 52, which provides a series of air ducts 53 between the interior of the frame and the exterior diameter of the stator and coils (only two being shown). An end of the frame 44′ is mounted and fastened onto a corresponding end of the motor adapter 54 as at 54′ in suitable manner. And onto the other end of the frame 44′ is mounted and fastened the end bell 55 as at 55′ of which the fastenings are not shown. The end bell 55 having a hub with a cavity for mounting the bearing 56 for this end of the tubular constant speed shaft 57. This constant speed shaft 57 may also be termed the motor shaft, for it mounts the motor rotor 58. The rotor 58 being keyed to the shaft 57 and disposed between a shoulder 57′ and an end of the spacer 59 and the other end of this spacer abutting the inner race of the bearing 56, while the other end of this inner race abuts a lock nut means 60 on this end of the shaft 57. Whole of which provides means whereby, the motor as a whole or in part being removable or installed without disturbing any other part of the unit beyond the left end of the motor. The adaptor 54 and the end bell 55 having openings 61 for usual ventilating purposes. A positive seal 62 being disposed in adjacency to the bearing 56 and thereby sealing the fluid 43 from entering into the motor upon its being caused to form a lubrication wetting of the bearing 56 as will be seen. The motor adapter 54 has an end wall 63 that is bored for the bearing adapter 64, which is suitably fastened thereto, as by screws not shown. And this bearing adapter has a cavity for mounting the bearing 65 and the positive seal 66, thereby providing of straddle mounting of the motor rotor 58 between a pair of shaft bearings. The bearing 65 has one of its ends exposed to the interior of the inclosure 42 so as to provide of its being lubricated by the fluid 43, as will be seen. A portion of the end wall 63 is suitably formed to fit fluid tight into the opening 67 in the wall 68 of the inclosure 42, as at 68′ and suitably fastened thereto, as by screws not shown.

As shown Figures 1 and 2, the housing 41 is formed of a rearward section 69 and a forward section 70. In which the rearward section 69 has an opening 71, into which is suitably fitted fluid tight an end of an adaptor ring 72, as at 69′, and correspondingly the other end of this adaptor ring is suitably fitted as at 70′ onto the forward section 70, all suitably fastened so as to form a single structure. The adaptor ring having a pair of spaced flanges to facilitate placement of the fasteners not shown, also it provides a means whereupon by merely changing the diameter of the forward flange of the pair, readily permits of applying various sizes of forward end and thereby accommodate various sizes of speed change gearing, while retaining the opening 71 therein the rearward section 69. The adaptor ring 72 has a wall 73, having a series of cored holes 73′, forming intercommunication openings for the fluid 43, so as to form a continuous fluid pool throughout the range of various mountings of the unit. Also the wall 73 has a hub, for mounting the bearing 74, which bearing provides a journalling for this end of the tubular variable speed shaft 75. The forward section 70 includes the base 51 for mounting the unit onto a foundation. And internally the forward section 70 suitably mounts a desired speed change gearing, of which its input shaft, as will be seen, is mounted within the tubular variable speed shaft 75 in novel manner.

Concentric relative to the spaced axis of each of the shafts 57 and 75, the wall 76 of the inclosure 42 has a pair of openings 77 for supportably mounting a pair of seal adaptors 78, hereinafter described. And intermediate of the openings 77, the wall 76 has an extension 79 which extends cantilever fashion longitudinally intermediate of the constant speed shaft 57 and the variable speed shaft 75. The extension 79 includes an aperture 80 that extends from within the inclosure 42 to the outward or free end of this extension 79, and into which extends the shank 81 of the takeup means 49, hereinafter described. And the outward end of the extension 79 has a pair of transverse arms 82, that extend from the outward end of the extension 79 to the rear or outboard end of both the constant and variable speed shafts. And each of these arms 82 has a hub 82' that in each instance provides support for the bearings 83, which provide a journalling means for this end of these spaced shafts. Each of the bearings 83 including a seal and being of type to handle angular and thrust loadings, and having their outer races anchored within the hubs 82' by caps 84, which are suitably fastened onto the hubs, as by screws not shown, while the inner races in each instance are anchored onto the respective shafts between a shoulder and a snap ring, thereby providing fixed anchorage relative to endwise shifting of these spaced shafts. Each of the caps 84 have a cavity 84', which forms a part of the apertured system that provides for continual wetting of the bearings 83 and other metal to metal actuating parts of the unit by part of the fluid 43, as will be seen.

Figure 3:
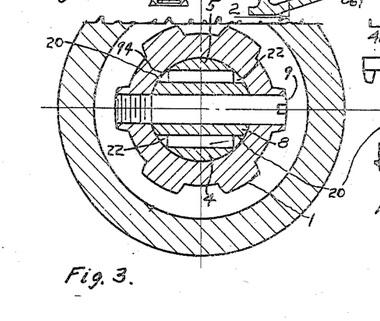
Figure 3 is an enlarged cross-section taken generally on the line 3—3 Figure 1, showing the relationship of the shaft pin relative to the transverse width of an oppositely disposed pair of splines. It also shows an end view of the series of four fluid channels.
Figure 4:
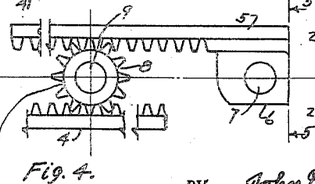
Figure 4 is an enlarged side view of the rack members and mating gear pinion, taken apart from the transmission.
Figure 5:
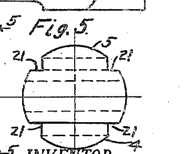
Figure 5 is an end view taken on the line 5—5 Figure 4.

Referring to the Figure 1, it is readily seen that the tubular constant speed shaft 57 has one end journally supported by the bearing 56 and it extends through a portion of the inclosure 42, and its other end being journally supported by the bearing 83. While the tubular variable speed shaft 75 has one end journally supported by the bearing 74 disposed within the inclosure 42 and this shaft extends therefrom with its other end journally supported by a corresponding bearing 83. Then externally beyond the inclosure 42, intermediate the wall 76 and one of the arms 82, on the shaft 57 is a variable effective diameter pulley generally indicated by the numeral 85. And correspondingly on the tubular variable speed shaft 75 is a variable effective diameter pulley 85, mounted in opposed cooperative position. The endless V-belt 86 in active driving relationship therewith the respective adjusted effective diameters of the pulleys, transmitting power from one shaft to the other at variable speeds. Each of the variable effective diameter pulleys 85 formed of a relative axial adjustable pair of sections 87 and 88 having opposed inclined belt engaging faces for engaging opposite sides of the V-belt 86, through the relative axial adjustable range. In which the section 87 includes a hub 89 and the section 88 includes a hub 90, both these hubs 89 and 90 being slidably mounted onto their respective shaft and having telescopic engagement relative to one another, as at 91, and this end of the hub 90, mounts the positive seal 92 slidably sealing and engaging the telescopic surfaces of the hub 89. While the other end portion of the hub 90 extends into the inclosure 42 and having an external surface slidably contacting the seal 93, mounted within the seal adaptor 78, heretofore mentioned. The sections 87 and 88 being suitably joined fixedly thereon their respective hubs, so that in each instance, forming an individual structure. And the drive means 1, between these structures and their respective shaft consisting of, external splines on the shafts extending axially from the point X to an adjacency of an end of the bearing 65, so that a portion of the drive means 1, extends into the inclosure 42, as internally the hubs 89 and 90 having corresponding splines, best seen at the Figure 2. And an oppositely disposed pair of the external splines 1, having a first pair of slots 2 and spaced axially therefrom a second pair of slots 3, extending through the walls of each of the tubular shafts 57 and 75, thereby forming passages to the interior of the shaft in each instance, and providing for the fluid 43 causing lubricant wetting of surfaces of the drive means, as will be seen. The shafts 57 and 75 each having a bore 94 extending to and beyond the second pair of slots 3 for operably engaging corresponding diameter surfaces of a first rack 4 and its head, and a second rack 5 and its head. The racks 4 and 5 having gear teeth beyond the heads, and each of the heads having externally a plane surface 6 and internally a hole 7 extending therethrough parallel to the axis of the gear teeth, best seen at the Figures 4 and 5. And within each bore 94, the racks 4 and 5 being arranged in pair with their respective gear teeth in mesh oppositely with a gear pinion 8, which is journally supported by its shaft pin 9, that is fixedly attached in the walls of the bore 94 intermediate of and in alignment to the pairs of slots 2 and 3, best seen at the Figures 3 and 4. And coaxial relative to the shaft pin 9, the pinion 8 having a pair of projections 20, of diameter to coincide with the root diameter of its gear teeth, and said projection 20 including spherical ends substantially of diameter of the bore 94. While each of the racks 4 and 5 having a pair of notches 21, disposed to correspond with the diameter and length of the projections 20. Whereby upon the racks 4 and 5 and the pinion 8 within the bore 94, when in telescopic position forms, a series of channels 22 extending from opposite end of the heads, spaced from the passages on the perimeter of the bore 94, thereby providing fluid channels within the bore of each of the shafts, as will be seen.

A transverse pin 10, fixedly attached to the walls of the hub 90 while extending through the pair of slots 3 and the hole 7, to form a rigid joining of the rack 5 thereto the hub 90, so that upon causing an axial adjustment of the hub 90, moves correspondingly axially the rack 5. And a transverse pin 10', fixedly attached to the walls of the hub 89, while extending through the pair of slots 2 and the hole 7, forms a similar rigid joining of the rack 4 thereto the hub 89. So that upon effecting the above mentioned axial adjustment and the corresponding axial movement of the rack 5, which causes a rotative actuation of the pinion gear 8, which due to the opposite disposed rack 4 simultaneously causes a similar axial movement of the rack 4 oppositely, whereby causing the sections 87 and 88 to move controllably toward and away from one another, thereby controlling the effective diameters of the pulleys 85, for it forms an operable linkage means extending between portions of the control means 47, that is disposed within the inclosure 42, hereinafter described.

Referring to the Figure 1, at the shaft 57 the pulley 85 is shown adjusted to its minimum effective diameter, while at the shaft 75, the pulley 85 is shown adjusted to its maximum effective diameter. And it is to be particularly observed, that throughout their range of variable effective diameter adjustments or axial adjustments of the sections 87 and 88 the edges of the transverse pins 10 always remain within the inclosure 42. Also it is to be particularly noted, that throughout a corresponding range of the telescopic engagement 91, the edges of the transverse pins 10', always remain therein, thereby maintaining the respective slidable sealing contacts of the seals 92 and 93 therewith the respective surfaces at the hubs 89 and 90. And referring to the Figure 3, it is to be particularly observed that the shaft pin 9 has substantially an external surface of uniform diameter. And that it extends through an oppositely disposed pair of external splines 1, having a transverse width whereby the shaft pin 9 remains within the range of said transverse width and thereby avert of the shaft pin of uniform diameter interfering with axially slidable movement of the corresponding spline therein the pulley hub members. Also it provides of maximum load bearing area for the shaft pins.

Then within the inclosure 42 on each of the shafts 57 and 75, is a thrust bearing 95 of the double row preloaded variety, with its inner race anchored fixedly between a shoulder and the snap ring 23 onto an end of the extension of the hub 90, and with its outer race anchored fixedly between a shoulder and the snap ring 24 within the casing 96. And externally the casing 96 includes the shaft 25 for and operably mounting the control roller 26, thereby forming a single structure, whereupon causing of an axial movement of the control roller 26 toward and away from the V-belt causes, due to the operably attached linkage means hereinabove dealt with, a corresponding axial adjustment of the sections 87 and 88, with consequent change of the effective diameter of the pulley 85 at each of the shafts 57 and 75. And as will be seen, such axial movements as well as the effective diameters of both the pulleys 85 are controlled in positive manner by the oppositely disposed pair of inclined curved grooves 19 and 19' of the nut member 97 hereinafter described.

Referring to the Figure 1, the seal adaptor 78 being suitably fastened (as by screws not shown) onto the wall 76 of the inclosure 42, while its hub mounting the positive seal 93 extends into the opening 77 at each of the shafts 57 and 75. And each of the adaptors 78 having a projection 98 that includes an end of segmental form and having a surface that is parallel and coaxial relative to the longitudinal axis of the shaft extending through the adaptor, thereby forming a pair of abutment connections 99 within the inclosure 42 for corresponding crescent form ends of a control unifying element 27. And referring to the Figure 2, these abutment connections 99 are shown in section and for convenience have indicated an outline of the adaptor 78 at each shaft by means of dash lines, altho they occur to the left of the section 2—2, Figure 1. And again referring to the Figure 1, the rearward face of the unifying element 27 includes a boss 27' which has internal screw threads, into which is threadingly connected the screw threaded end of the shank 81 of the takeup means 49 that extends through the aperture 80 of the cantilever extension 79 as had heretofore been mentioned. And in adjacency to the outward end of the shank 81 is an enlarged head, of which one face abuts a shoulder of a bore within the free end of the extension 79 and the opposite face abuts an inner surface of the cap 28, which cap is suitably secured onto the free end of the extension, as by screws not shown. And these abutments of the head, serve to prevent of endwise shifting of the takeup means 49, all the while allowing of its being rotated by means of a wrench as the free end is provided with flat faces for the application of said wrench. Then in adjacency to the cap 28 the takeup means includes screw threads and a lock nut 100, which serves to prevent of undesirable actuation of the takeup. Then the forward face of the unifying element 27 at each of its side ends includes a forward wall 29, having appropriate bores forming journalling support for the lead screw 13 of the control means 47 and the indicator stem 14 of the indicator means 48, also provides a mounting support for the non-rotating guide rod means 15.

Referring to the Figures 1, 2 and 7, intermediate relative to the spacing of the shafts 57 and 75, the wall at each side of the inclosure 42 has an opening 30, with a speed indicator scale bracket 31, that includes surfaces for contacting corresponding surfaces on the walls in adjacency to the openings 30 as at 30', best seen at the Figure 2. The outward face of each scale bracket 31 carrying appropriate indicia 31', numbered one to nine or any other desired indicia to indicate a ratio or speed adjustment of the unit, as will be seen. The guide rod means 15 while being supported by the unifying element 27 extends transversely through the inclosure and extending through and beyond the brackets 31, and their outward ends having screw threads and nuts 32. So that upon tightening up of the nuts 32 causes a clamping at the surfaces 30' and effect closure of the openings 30. While within the inclosure 42 intermediate of the walls 29 of the unifying element 27, the guide rod means 15 mounts slidably the nut member 97 having the internal screw threads 97' for the lead screw 13 and holes for the guide rod means 15 and the indicator stem 14, hereinafter described. The lead screw 13 while being journally supported by the unifying element 27 extends transversely through the inclosure 42 parallel to the guide rod means 15, and extending through and beyond the brackets 31. And at least one of its outward ends mounting the crank 101 or other means for causing a desired rotation of the lead screw. Intermediate of the walls 29 of the unifying element 27, the lead screw 13 includes the external screw threads 13', which threadingly engage the internal screw threads 97' within the nut member 97 and at each side beyond the threads 13' the lead screw 13 includes a sleeve 33, that extends through the journalling at the walls 29 and abuts a thrust washer or shoulder disposed within hubs of the brackets 31, thereby preventing of endwise shifting of the lead screw, all the while allowing of its being rotated. And due to the screw threaded connection between the lead screw 13 and the nut member 97, rotation of the lead screw 13 causes a transverse movement of the nut member, which as will be seen effects a correlative axial adjustment of the sections 87 and 88 simultaneously at both the pulleys 85, with consequence of change of the ratio or speed of the unit. Also the indicator stem 14 while being journally supported by the unifying element 27, extends transversely through the inclosure 42 parallel to the lead screw 13, and extending through and beyond the brackets 31, and at both outward ends beyond the brackets mount a pointer 34, that indicates on the scale or indicia the transverse position of the nut member 97 and consequent speed adjustment of the unit. And as the stem 14 extends through the nut member 97 and includes a spiral groove 16, into which extends the dog point of the setscrew 17. The setscrew 17 being anchored onto the nut member 97 (best seen at the Figure 1), so that upon causing a transverse movement of the nut member 97 by actuation of the lead screw 13, causes a rotative actuation of the stem by an external surface of the dog point engaging a side wall of the spiral groove 16.

Then the unifying element 27 also forms support for the resilient reactance device, generally indicated by the numeral 18, shown and fully described in my Patent 2,799,176, dated July 16, 1957. The device 18, consists of a pair of pivot castings 35, or mounting means, a pair of spring steel rods 36 or resilient means, and a pair of wings 102 extending transversely from each side of the casing 96, best seen at the Figure 2. Each pivot casting 35 has a hub with a first cored hole, into which extends the external diameter of the journalling support for the lead screw 13, as at 11, which forms the pivot point or pivotal support for the mounting means 35 about which the device 18 pivots, but only upon effecting a speed change, otherwise it remains stationary. And spaced from the first cored hole the pivot casting has a second cored hole extending at right angle to the first cored hole, through which the rod 36 extends at each side of the unifying element 27, with the ends bearing onto a hump or surface means on each of the wings 102, when in sprung position, as at 12, see Figure 1, wherein the spring steel rods 36 are shown by means of dotted lines in sprung position, thereby exerting a predetermined amount of thrust force in direction opposite to that produced by the wedging action of the V-belt upon the faces of the sections 87 and 88. And said thrust force produced by the reactance device 18, remain substantially constant throughout the range of speed adjustments, however it in no way pertains to matters controlling the effective diameters of the pulleys 85 when applied to relieve the control 47 of the corresponding, but oppositely produced forces of the V-belt. And as the pivot point occurs mid-distance between the shafts 57 and 75, said thrust forces are alike at both shafts. And of which the disposition of the pivotal support provides of these thrust forces together with that caused by the V-belt being transmitted onto corresponding portions of the housing 41 apart from a control, and thereby providing easy operativeness of the control in that it need only be of any suitable arrangement so as to control the tiltable position of the reactance device about its pivotal support, while substantially maintaining its predetermined amount of forces. Then this device 18, serves a second purpose, which is that it serves to prevent a rotative movement of the casing 96, by portion of the wings abutting corresponding side surfaces of the rods 36.

The nut member 97 extends intermediate of the shafts 57 and 75 and each of its ends in adjacency to said shafts, includes the oppositely inclined curved grooves 19 and 19′, into which extend the corresponding disposed control rollers 26; whereby the side walls of the grooves 19 and 19′ forms correspondingly oppositely sloped curved guide tracks to control the axial position of the respective control rollers 26; and thereby correlatively control the effective diameters of the pulleys 85. Then intermediate of the grooves 19 and 19′ the nut member 97, includes a series of holes in alignment with one another and extending transversely therethrough for the guide rod means 15, the lead screw 13 and the indicator stem 14 heretofore described. Also heretofore mentioned the nut member 97 is mounted slidable onto the guide rod means 15 and wherein the lead screw 13 engages the nut member 97 threadingly, so that upon causing a rotative actuation of the lead screw 13, causes the nut member 97 including its grooves 19 and 19′ to move in a transverse direction relative to the longitudinal axis of the shafts 57 and 75. And referring to the Figure 2, the arrowed distance A represents the transverse length of the nut member 97, and its position at one extreme of its transverse movement. And the arrowed distance B represents its transverse movement distance, also its other extreme position. And when the nut member 97 is in the position A the pulley 85 on the shaft 57 is adjusted to its minimum effective diameter, while the pulley 85 on the shaft 75 is adjusted to its maximum effective diameter. And by actuation of the lead screw 13, so that the nut member 97 is caused to move transversely to the position B the effective diameter of the pulley 85 on the shaft 57 becomes adjusted to its maximum effective diameter, while the pulley 85 on the shaft 75 becomes adjusted to its minimum effective diameter. And during the above transverse movement of the nut member 97, due to the dog point engagement of the set screw 17 therewith the side walls of the spiral groove 16, causes a corresponding rotative actuation of the indicator stem 14, so that the pointer 34 at both sides of the unit, points to the corresponding position nine on the outward face of the scale or indicia 31′.

Figures 6, 10, 11, 12, 13, 14, 15, 16:
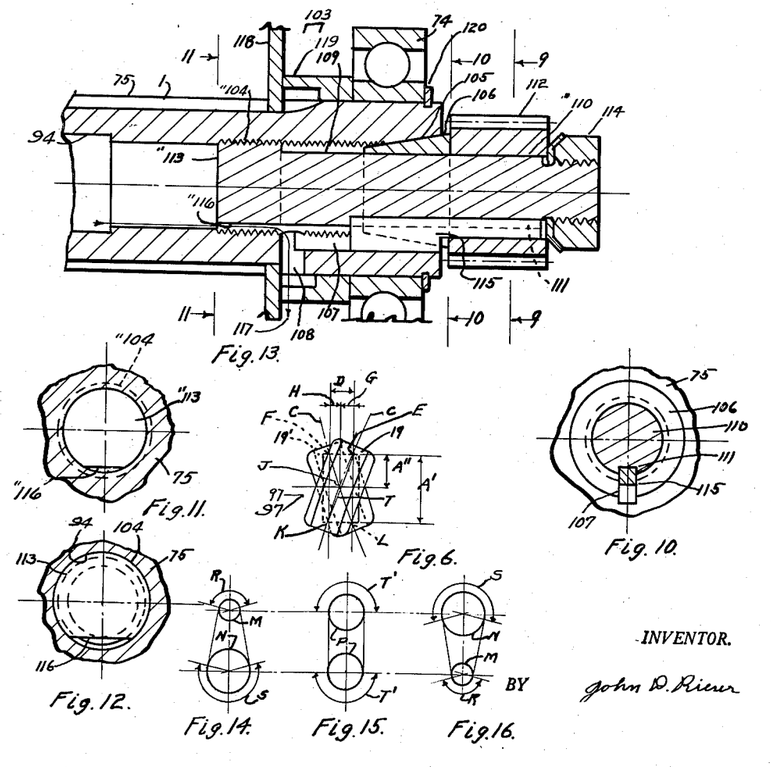
Figure 6 is a plan view of the nut member showing the relationship of its oppositely disposed curved grooves for controlling the effective diameters of the pulley at both shafts, taken apart from the transmission.
Figure 10 is a cross-section view taken on the line 10—10 Figures 8 and 13.
Figure 11 is a cross-section view taken on the line 11—11 Figure 13.
Figure 12 is a cross-section view taken on the line 12—12 Figure 8.
Figure 13 is a view like Figure 8 of a modified embodiment of my invention.
Figure 14 is a plan view to reduced scale and taken apart from the Figure 1, and showing by means of circles the effective diameter at the respective pulleys when the unit is adjusted to its low speed adjustment.
Figure 15 is a plan view like that of Figure 14, but showing the effective diameter at the respective pulleys when the unit is adjusted to the mid position.
Figure 16 is a plan view like that of Figure 14, but shows the effective diameter at the respective pulleys when the unit is adjusted to its high speed adjustment.

Referring to the Figure 6, which is a plan view of the nut member 97 apart from the unit. And shows the relationship of the oppositely inclined curved grooves 19 and 19′ of the nut member 97. Of which the curved pitch line C, which is a segment of a true circle, and in each instance represents the pitch diameter of the grooves 19 and 19′, also represents the axial center of the control roller 26 (not here shown) as the nut member is caused to move transversely, and the arrowed distance A′ represents the transverse movement range of the nut member 97, of which the arrowed distance A″ represents one-half of the transverse movement range A′. Also the crossing point of the two oppositely disposed curved pitch lines C. And the arrowed distance D represents the inclination range of the oppositely disposed curved pitch lines C also it represents the axial adjustment range or axial adjustable distance of the control rollers 26 and the sections 87 and 88 of each of the pulleys 85, as will be seen.

Referring to the Figure 1, the pulley 85 on the shaft 57 is shown adjusted to its minimum effective diameter (M Figure 14) with the control roller 26 riding within the groove 19, and with reference to the Figure 6, correspondingly the center of the control roller 26 is at the point E, while with reference to the pulley 85 on the shaft 75, Figure 1, which is adjusted to its maximum effective diameter (N Figure 14) with the control roller 26 riding within the groove 19′ and correspondingly with reference to Figure 6, the center of the control roller 26 is at the point F. Re-Figure 1, let it be assumed that the lead screw 13 be actuated so that the nut member 97 with its oppositely inclined curved grooves 19 and 19′, is caused to move transversely the distance A″ Figure 6, which causes the control roller 26 in the groove 19 to move axially the distance represented by the arrowed distance G and simultaneously causes the control roller 26 in the groove 19′ to move correlatively axially the distance represented by the arrowed distance H, therefore both the control rollers 26 were caused to move axially to the mid point J. And this mid position J represents the mid effective diameters (P Figure 15) of both pulleys 85, that is the effective diameters of both the pulleys 85 are alike, consequently the drive ratio is one to one. And it is to be particularly noted, that the axial adjusted distance G is greater than that of the axial adjusted distance H, this is correct to maintain the driving relationship of he V-belt therewith the variable effective diameters of the pulleys 85, for the very reason, that the distance of the angle of wrap of the V-belt about the respective effective diameters, was less at the small effective diameter (R Figure 14) of the pulley on the shaft 57, therefore greater effective diameter change was required at this pulley to accommodate the belt unwrap about the larger effective (S Figure 14) at the shaft 75. And at the mid effective diameter position the distance of the angle of wrap (T′ Figure 15) of the belt about the alike effective diameters of the pulleys at both shafts are the same, but for the instance only. And in continuation of the actuation of the lead screw 13, so that the nut member 97 with its oppositely inclined curved grooves 19 and 19′ is caused to move transversely the balance of the distance A′ Figure 6, which causes the control roller 26 in the groove 19 to move axially the distance represented by the arrowed distance H to the position K, and simultaneously causes the control roller 26 in the groove 19′ to move axially the distance represented by the arrowed distance G to the point L. All of which occurs in same manner as that when effecting the first half transverse movement A″ of the nut member 97, but in reverse order. This is in correct order, for in the present instance, the variable effective diameter range of the pulleys are alike on the shafts 57 and 75. Therefore the pitch of the opposed inclined curved grooves 19 and 19′, of which their walls forming tracks for the control rollers 26 are alike, but arranged in a reversing manner, crossing one another at the mid position J. And the Figure 16 is same as that of the Figure 14 but with the effective diameters shown in reverse order. In which the hypotenuse of a right triangle formed by the axial adjustment distance D and the transverse movement distance A′, forms the chord T of the segment of the pitch diameter of the curved pitch line C of the oppositely inclined curved grooves 19 and 19′ of the nut member 97, and of which the crossing or mid point J constitutes the mid effective diameter of the pulleys 85 on the shafts 57 and 75, and correspondingly the rise point of said segment, of which the length of the chord relative to the length of the rise terminates the pitch diameter of the pitch curve C.

An operable unification is produced by the unifying element 27 of the control means 47 and the indicator means 48 within the inclosure 42. And in which the pair of abutment connections 99 between the segmental formed ends of the projections 98 of the seal adaptors 78 and the corresponding crescent formed ends of the unifying element 27 (heretofore described) provides cooperative abutment surfaces, whereby upon actuation of the takeup means 49, provides of movement of the control means 47, the indicator means 48 and the operably connected linkage means, with the exception of the pinions 8, in direction parallel to the longitudinal axis of the shafts 57 and 75, toward and away from the center of the V-belt; and in which the wide scope of the transversely formed abutment connections 99 (best seen Figure 2) provides of maintenance of the rectangularity of the unifying element 27 relative to the axes of the shafts.

Referring to the Figures 1 and 2, and let it be assumed that it is desired to alter the effective diameters of the pulleys 85 on the shafts 57 and 75, to effect a change in the belt path length (pitch) about and between the effective diameters for the V-belt 86 to accommodate the pitch length of the V-belt or compensate for service wear. The nuts 32 on one end of the guide rod means 15 and the lock nut 100 at the free end of the takeup means 49 are loosened slightly, and then the takeup means 49 is rotated by means of a wrench in a desired direction, which due to its screw threaded connection therewith the unifying element 27 of the control means 47, causes positive movement of the entire control means 47 with the exception of the pinions 8 but, including the indicator means 48 and the indicator scale brackets 31 as a single unit, toward and away from the center of the V-belt 86, with consequent desired axial adjustment of all the sections 87 and 88 simultaneously by equal amount. That is when employing the takeup means 49 for purpose of changing the belt pitch path length, the effective diameters change in like direction, either they both increase by like amount or they both decrease by like amount, therefore the employment of the takeup means 49 will not at any time change the angle of wrap of the V-belt 86 at either of the pulleys 85. It merely increases or decreases the distance around their respective effective diameters. This is not the case when adjusting the effective diameters of the pulleys 85 on the shafts 57 and 75, upon actuation of the lead screw 13, for then these effective diameters are changed oppositely, that is, one increases while simultaneously the other decreases, but not by like amount. However, as the takeup means changes these effective diameters by like amount, provides of maintenance of the controlling relationship of the control rollers 26 therewith, the opposedly inclined curved grooves 19 and 19' of the nut member 97. Also it provides of similar maintenance of the indicator means 48. Then after the desired takeup adjustment has been made, the nuts 32 and the lock nut 100 are tightened, which produces a locking of the takeup adjustment.

The form and the disposition of the transverse arms 82 together with their hubs 82' and the extension 79, provides means whereby the endless V-belt 86 is placeable and removable from the variable ratio mechanism 46, while maintaining the assembly relationship of the variable ratio mechanism 46, including the control means 47 and the indicator means 48, by the employment of the takeup means 49. And for illustrative purposes, let it be assumed that it is desired to remove the endless V-belt 86, Figure 1, therefrom the unit. The nuts 32 on one end of the guide rod means 15 and the lock nut 100 at the free end of the takeup means 49 are loosened slightly, and again the takeup means 49 is rotated by means of a wrench in direction to cause the unifying element 27 to move in direction away from the V-belt, which correspondingly moves axially the pair of sections 87 and 88 away from one another at each of the pulleys 85, which furnishes ample belt slack, so that a portion of the belt can readily be worked, by hand, over the rim of the section 87 at the shaft 75, and after it has been removed entirely therefrom this pulley V groove, this portion of the V-belt is shifted toward the left side of this pulley, which provides of ample belt slack, so as to readily permit of its being lifted, by hand, therefrom the V groove of the pulley 85 on the shaft 57, whereupon due to the provision that the hubs 82', arms 82 and extension 79 are entirely within reach of the inner perimeter of the endless V-belt 86, readily provides of its being removed entirely therefrom the unit, without disturbing the assembly relationship of the variable ratio mechanism 46, including the control means 47 and the indicator means 48, for reversely, it is obvious that the endless V-belt 86 can readily be installed therein the V grooves of the aligned pulleys 85. And after the endless V-belt has been placed, the takeup means 49, is rotated in opposite direction to provide of desired belt tension, which then is locked by tightening up of the nuts 32 and the lock nut 100.

Figures 8, 9:
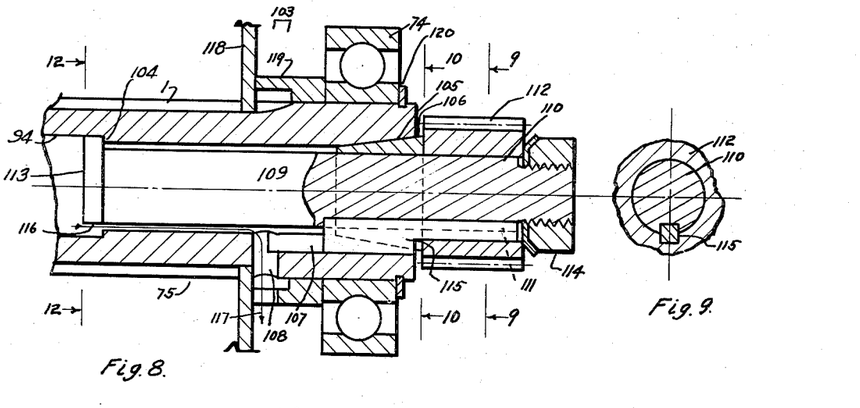
Figure 8 is an enlarged fragmentary view partly in section at the end of the variable speed shaft and showing attachment therein of a power takeoff shaft and/or power input shaft of the speed change gearing with its first gear mounted onto the power input shaft.
Figure 9 is a cross-section view taken on the line 9—9 Figures 8 and 13.

In the aforementioned application, the first gear or pinion of the speed change gearing is mounted onto an external diameter of the tubular variable speed shaft of the adjustable speed mechanism, which necessitates a large diameter pinion, consequently restricting the speed change ratio of the speed change gearing within a given size inclosure. And to overcome this restriction, the present invention provides for the mounting of a regular first gear pinion of lesser diameter than that of the diameter of the variable speed shaft 75, and thereby maintain the speed change ratio of the speed change gearing within a corresponding regular size inclosure. And with reference to the Figure 1, the numeral 103 designates generally the renewable power takeoff of the variable speed shaft 75, or input shaft and pinion shaft for the speed change gearing 45. Of which the Figure 8, shows an enlargement apart from the unit, and internally beyond the inner end of the shaft 75, the bore 94 provides the shoulder means 104, while said inner end includes the taper bore 105, with a corresponding tapered split bushing 106 extending therein. Also this end of the shaft has the internal keyway 107, extending through the taper bore 105 to the angular aperture 108, which extends through a wall of the tubular shaft 75 and thereby, together with the plane surface 116 forming the free return 117 for part of the lubricant fluid 43, as will be hereinafter described. Within the tubular shaft 75, the pinion shaft 110 includes a head 113 which includes a surface means corresponding to and engaging the shoulder means 104, and extending from the head 113 the pinion shaft 110 includes the shank 109, which extends beyond the inner end of the shaft 75, onto which beyond the tapered split bushing 106, is mounted the pinion gear 112 or first gear of the speed change gearing 45. Then beyond the pinion gear 112, the shank 109 includes screw threads for the lock nut means 114, so that the pinion gear extends between the large end of the tapered split bushing 106 and the lock nut means 114. The tapered split bushing includes a straight bore conformable to the diameter of the shank 109 where it passes therethrough. And the shank 109 includes an external keyway 111 extending from the small end of the bushing and outwardly through the pinion gear 112. The key 115 extending within the internal keyway 107, the external keyway 111 and a corresponding keyway within the pinion gear 112. All of which provides for rigid mounting of a regular first gear pinion of a regular speed change gearing, for upon tightening up of the lock nut means 114 causes wedging of the tapered split bushing 106 into the taper bore 105 and seizing of the shank 109 in adjacency of the pinion 112, by simultaneously causing a pressing of the pinion against the large end of the bushing 106 and the engaging of the surface means therewith the shoulder 104 and in which the key 115 forms drive means between the pinion shaft 110 and the variable speed shaft 75.

It is perfectly apparent that the above provides, that the pinion shaft and/or pinion are readily renewable and changable and thereby obviate having to provide an entire variable speed shaft 75, for replacement purpose or to accommodate each individual size pinion or its bore, as is the established prior practice.

For the prior practice of speed change gearing, wherein the first gear pinion is mounted overhung, provided that the pinion be mounted onto an integral reduced diameter of the driving shaft, or that the pinion itself have an integral shank, which shank is pressed into a bore within the end of the driving shaft, both of which present well known objectional features. For when a driving shaft is turned down to accommodate the bore of a small size pinion, introduces a weak point of the driving shaft of which it is an integral part, and upon breakage of this reduced diameter pinion shaft, the entire driving shaft must be renewed, also it involves having to provide entirely different driving shafts to accommodate various sizes of pinion bores. And in cases wherein the shank of the pinion itself is pressed into an end of the driving shaft, involves features wherein the press fit between the two must be such so as to maintain precise axial alignment, consequently it is an established practice to provide a new variable speed shaft in its entirety when a different or new pinion is required.

The Figure 13, shows a modified form of the renewable power takeoff of the variable speed shaft 75 or input shaft and pinion shaft for the speed change gearing 45, and throughout applying the same numerals, relative to parts that are similar to those of the Figure 8, and where they differ slightly, use the same numeral, but with the prefix (") before the numeral. Re-Figure 13, the inner end of the shaft 75 includes the taper bore 105, with a corresponding tapered split bushing 106 extending therein. Then internally beyond the taper bore 105, is the shoulder means "104, which in the present instance are shown in the form of screw threads. Also said inner end of the shaft 75, has the internal keyway 107, extending through the taper bore 105 to the angular aperture 108, which extends through a wall of the tubular shaft 75 and thereby together with the plane surface "116 forming the free return 117 (as heretofore) for part of the lubricant fluid 43. Within the tubular shaft 75, the pinion shaft "110 includes a head "113, which includes a surface means corresponding to and engaging the shoulder means "104, and extending from the head "113 the pinion shaft "110, includes the shank 109, which extends beyond the inner end of the shaft 75, onto which beyond the tapered split bushing 106, is mounted the pinion gear 112, or first gear of the speed change gearing 45. Then beyond the pinion gear 112, the shank 109 includes screw threads for the lock nut means 114, so that again the pinion gear extends between the large end of the tapered split bushing 106 and the lock nut means 114. The tapered split bushing includes a straight bore conformable to the diameter of the shank 109 where it passes therethrough. And the shank 109 includes an external keyway 111 extending from the small end of the bushing outwardly through the pinion gear 112. The key 115 extending within the internal keyway 107, the external keyway 111 and a corresponding keyway within the pinion gear 112. Again all of which provides a rigid mounting of a regular first gear pinion of a regular speed change gearing, as heretofore described relative to the Figure 8. And it contemplates that clearances be allowed between the diameter of the head 113 relative to the diameter of the bore 94, Figure 8, and correspondingly relative to the diameter of the engaging of the head "113 therewith the diameter of the screw threads forming the shoulder means "104, so that wedging of the tapered bushing into the taper bore, causes and without hinderance, maintenance of suitable and rigid axial alignment of the related parts, in both instances. Then since the development Figure 13, provides of the pinion shaft "110 being inserted into the shaft 75, from its inner end, it is realized that same can readily be applied onto solid shaft type units. Also it can be extended to provide a variable speed power takeoff shaft of the unit, when the speed change gearing is excluded.

In the manufacture of the units the matter concerning, that the external diameter of the tubular shaft 57 and 75, be of such diameter so as to suitably cope with the power transmitting requirements of the unit, is of material substance. And often resulting, that the external diameter of the shafts, relative to the bore 94, produces the condition wherein the cross-section area of the metal beyond the root of the rack teeth, or backing, of the racks 4 and 5, becomes such so as to prohibit of the inclusion of lubricant fluid channels in the backing, to provide for the fluid bypassing beyond the pair of racks 4 and 5 and the mating pinion 8, when in telescopic position, such as when the effective diameter of a pulley 85, is adjusted to its maximum, as at the shaft 75, Figure 1, where it is shown that the end of the rack members bypass the plane surface 6 of the rack head in each instance, which forms an obstruction at the perimeter of the bore 94. And to overcome these obstruction matters, the present invention provides the series of notches 21 and the projections 20, heretofore described, and thereby providing straight through free bypass channels for the fluid 43, as will be seen. And it is to be particularly noted, that the inclusion of the projections 20 and the series of notches 21, does not materially impair the cross-section area of the backing, or strength of the gear teeth of the pinion and the racks 4 and 5, or the provision of spherical ends of the projections 20, which later serves to prevent of endwise shifting of the pinion 8, and thereby maintaining alignment of the ends of the respective gear teeth, best seen at the Figures 3, 4 and 5.

Then referring to the Figures 8, 11, 12 and 13 the plane surface 116 and the angular aperture 108 in each instance, as heretofore mentioned, forming the free return 117 for the excess part of the fluid 43 returning to the fluid pool within the inclosure 42 all the while, the inner end of the variable speed shaft 75, includes the heretofore described renewable power takeoff 103.

The above obstruction matters, are not involved therein the aforementioned application, for it does not contemplate the features concerning the deposition of the pins anchoring its rack members to the respective hubs or pulley sections, in the sense of the present invention, nor does it involve of the ends of the racks bypassing their head portions. Then further since it does not contemplate the inclusion of the power takeoff in the sense of the present invention, its free return of the excess fluid relies upon the inner end of the variable speed shaft having an open end therein the fluid inclosure. Or that the variable speed shaft itself be extended to provide of a power takeoff when speed change gearing is excluded, consequently requiring an entirely different shaft to cope with such situations.

Then within the inclosure 42, the shaft 75 operably mounts the fluid propulsion means 118, which is disposed in adjacency to an end of the external spline 1, with a spacer 119 extending from one of its faces to an end of the inner race of the bearing 74, which race at its other end abuts the snap ring 120, so that the fluid propulsion means 118 and the shaft 75 rotate in unison. The fluid propulsion means 118 being of diameter so as to extend below the normal level of the fluid pool formed by the fluid 43 in the inclosure, so that upon operation of the unit, it causes a portion of the fluid 43 being propelled by centrifugal force above the normal level of the fluid pool continuously. And thereby effecting a corresponding continual lubrication wetting of the metal to metal actuating parts of the control means 47 together with the indicator means 48 and the bearing 65 and 74 disposed within the inclosure 42 mechanically. Also a portion of said propelled fluid is caused to enter into the open end of the orifice 121 disposed within the inclosure, also due to a portion of the inner surfaces 122 of the side and top walls (re-Figures 1 and 2) of the inclosure being sloped toward the open end of the orifice, and thereby causing the fluid to travel and drip therein as had been described in the aforementioned application.

The orifice 121, Figures 1 and 2, is disposed above the horizontal axis of the shaft 57 within the inclosure 42 and in the present instance, is shown as being an integral part of the motor adaptor 54. And the bottom of the orifice 121, joins with the first part of a four part series of improved apertured means, that extends from within the inclosure 42 and beyond and return within the inclosure 42 and forms with the propulsion means 118, a mechanical means for conveyance of a part of the propelled fluid in a continual manner to the drive means 1, the linkage means, the bearings at the end of the shafts 57 and 75 and other metal to metal actuating parts of the unit, and whence, the apertured means extends so as to return the excess propelled fluid to the fluid pool within the inclosure, for mechanical recirculation.

The first part of the apertured means, consists of the hole 123 at the bottom of the orifice 121, of which its upper portion joins the circular groove 124, that extends around the shank of the bearing adaptor 64, best seen at the Figure 1, and from this groove 124, the lower portion of the hole continues downwardly to an end, which is tapped for a union fitting of the tubing 125, which extends horizontally to a similar tapped end of the hole 126 at the end bell 55, and this hole 126 extends upwardly to a similar hole in the cap 133, which hole in the cap extends first upwardly then horizontally through the boss 127, which boss and its hole terminates beyond a hollow plug 128 that is fastened within an end of the shaft 57. Thus it becomes apparent, that due to the difference between the level of the orifice 121 relative to that of the axis of the shaft 57, provides sufficient hydraulic head so that as the fluid is caused as described to enter into the orifice, same is conveyed by the first part of the apertured means into the tubular shaft 57, through the open end of the boss 127. The thickness of the walls of the hollow plug 128, forming a fluid dam within the shaft 57, to regulate the amount of fluid that is desired to be retained within the shaft 57, or second part of the apertured means. And of the plug 128, its internal diameter is greater than that of the external diameter of the boss 127, where it passes through the hollow plug, to form a space therebetween and provide for the excess fluid overflowing the dam and spilling into the cavity 129 and effect lubrication for the bearing 56. Also as had been described therein the aforementioned application, from the cavity 129 if desired, the excess fluid can be returned to the inclosure 42.

Then the abovementioned second part of the aperture means, is formed of the heretofore described tubular shaft 57, the passages formed by the slots 2 and 3 and the series of channels 22. And upon the fluid discharging from the first part into the interior of the shaft 57 in a continual manner, the fluid retained within the dam, is caused by centrifugal forces inherently produced upon operation of the unit, to spread over the entire internal area therein the shaft 57 close to the perimeter of the bore 94 or the like, and thereby causing the fluid to flow from the right end to the left end of the shaft 57, where it spills into the cavity 84' therein the cap 84, or third part of the apertured means, as will be seen. Then in the centrifugal forces, causing the fluid to hug the perimeter surface of the bore 94 as it progresses axially therein, as it reaches the openings of the passages correspondingly causes that part of the fluid in adjacency thereto to spill therein and cause fluid wetting of the drive means 1, and as the series of channels 22 also occur at the perimeter surface of the bore 94, but spaced apart from the opening of the passages they correspondingly provide free passing of that part of the fluid in adjacency thereto and thereby provide of its progressing to the left end of the shaft 57 and spill into the beginning of the third part of the aperturedmeans, best seen at the Figure 1.

In the above it is to be particularly noted, that the series of channels 22 heretofore described, occur at the perimeter of the bore 94 and thereby provide of free unhindered channels for the fluid bypassing the passages or slots 2 and 3 and the linkage means formed by the pinion 8 and its mating pair of racks 4 and 5. They also relieve the seal 92 of having to resist the pressure produced by centrifugal action, were the fluid allowed to build up to a depth extending to the diameter of the bore 94 to form a means to bypass said linkage means.

In the present instance, the third part of the apertured means is formed of the aforementioned cavity in the cap 84 at the shaft 57 which has a tapped hole for the union fitting of the tubing 131, which extends to a similar tapped hole at the cap 84 that also includes a similar cavity 84', into which extends the left end of the tubular variable speed shaft 75 and its left end bearing 83, so that this bearing is lubricated by the fluid as it enters into this shaft 75, which starts the fourth part of the apertured means and of which the fourth part is similar to that of the second part of the apertured means, that is formed of the tubular shaft 75, the passages formed of the slots 2 and 3, the series of channels 22, but it includes the free return 117, heretofore described, which provides of free return of the excess fluid to the fluid pool within the inclosure 42 for recirculation. Thus it becomes apparent that the apertured means extends from within the inclosure 42 and beyond and returns to the inclosure.

Then a portion of the side walls 122 of the inclosure 42 in line with the opening of the orifice 121, includes a series of tapped holes 132, that are spaced and disposed to conform with the different positions of mounting of the unit, only one of these holes 132 being shown at the Figure 1, however at the Figure 2, the bosses for these holes 132 are indicated in a general manner, to show that they are spaced in conformity with the sloped surfaces 122 heretofore mentioned. Then after the mounting position of the unit has been determined, the hole 132 occurring above the corresponding adjusted position of the orifice, is to include a suitable filler fitting (and the balance of these holes to be provided with ordinary pipe plugs, neither of which are shown) so that upon introducing the fluid 43 through the filler fitting, causes it to spill directly into the orifice, whereby at least the first part of the apertured means becomes filled with the fluid before it overflows and thence spills to form the fluid pool within the inclosure.

I claim:

1. In a variable ratio transmission mechanism including a housing, said housing having a fluid inclosure and having operable mounting means for a motor, a pair of shafts in spaced parallel relationship, intermediate the spacing of said shafts, each side wall of said inclosure having an opening with a speed indicator scale bracket that includes surface means to form a closure for each said opening, variable effective diameter pulleys mounted in opposed cooperative positions on said shafts, each of said pulleys comprising a pair of sections having opposed inclined belt engaging faces externally beyond said inclosure and forming, by relative axial adjustment variable effective diameters, for an endless V-belt in active driving relationship to said pulleys, spline means, said spline means being disposed externally on said shafts and correspondingly within hub members of said pulleys and forming the drive means between the pulleys and the shafts, control means for mechanically varying said ratio, a portion of said control means being disposed within said inclosure with linkage means operably attached thereto while extending between said control means portion and said pulleys, said portion including a nut member disposed intermediate of said shafts and having internal screw threads and a pair of oppositely inclined curved grooves, disposed in direction transverse to the longitudinal axis of said shafts, a thrust bearing with its casing and operably attached control roller mounted fixedly onto each of said hub members that extends into said inclosure, said nut member being mounted slidably onto a guide rod means, and each said control roller being disposed so as to extend into one of said pair of curved grooves, so that the side walls of each of said curved grooves form a sloped curved track for its respective control roller thereby, upon causing a transverse movement of said nut member its oppositely inclined curved grooves cause one of said control rollers to move toward said V-belt while simultaneously the other roller is caused to move a correlative amount oppositely, thereby causing said axial adjustment while maintaining said driving relationship, a lead screw, said lead screw extending threadingly through said nut member and being journally supported for rotation while being fixed against endwise movement, so that a rotative actuation of the lead screw causes said transverse movement, a speed indicator stem, said stem extending through said nut member and having a spiral groove into which extends a dog point of a setscrew, that is anchored onto said nut member, so that effecting said transverse movement causes a rotative movement of said stem by an external surface of said point engaging a side wall of said spiral groove, said stem, said rod means and said lead screw extending through and beyond each said bracket, and the outward ends of said stem mounting a pointer means, said pointer means indicating on the scale the transverse position of said nut member and consequent speed adjustment of said mechanism at each outward side of said inclosure, and the outward ends of said rod means being provided with screw threads and nuts so that upon tightening up of said nuts causes clamping of said surface means against corresponding surfaces adjacent to said openings and effect said closure, while on at least one of said outward ends of said lead screw is mounted means for effecting said rotative actuation, and a fluid lubricant within said inclosure, a fluid propulsion means mounted within said inclosure operably connected to at least one of said shafts, said propulsion means extending to said fluid so that upon operation of said mechanism it causes part of said fluid being continually propelled above the normal level of the fluid pool within the inclosure and thereby causing wetting of surfaces of said portion of the control means and said indicator stem within said inclosure by part of said propelled fluid.

2. The invention according to claim 1, wherein the end wall of said inclosure in adjacency to said pulleys has an opening at each of said shafts and being coaxial thereto, for supportably mounting a pair of seal adaptors, each of said adaptors mounting a seal in contact with each said extending part, and having a projection extending toward one another, so as to provide a spaced pair of abutment connections of segmental form for corresponding crescent formed ends of a control unifying element, said element supportably mounting said guide rod means, said lead screw and said stem in parallel alignment to one another, and said abutment connections within said inclosure having surfaces parallel and coaxial relative to the longitudinal axis of said shafts and thereby provide for movement in direction parallel to said axis of said element while maintaining its rectangularity relative to the axes of said shafts.

3. In a variable ratio transmission mechanism including a housing, said housing having a fluid inclosure and having operable mounting means for a motor and a first tubular shaft and a second tubular shaft in spaced parallel relationship, variable effective diameter pulleys mounted in opposed cooperative positions on said shafts, each of said pulleys comprising a first and a second section having opposed belt engaging faces externally beyond said inclosure, forming by relative axial adjustment variable effective diameters, for an endless V-belt in active driving relationship to said pulleys, said first section having a first hub, said second section having a second hub, said first and second hubs having slidable telescopic engagement that includes a first seal engaging an external diameter of said first hub and being mounted fixedly within an end of said second hub, spline means, said spline means being disposed externally on said shafts and correspondingly within said first and second hubs and forming, drive means between the pulleys and the shafts, a pair of opposite disposed splines of said external spline means having a first pair of slots and spaced axially therefrom a second pair of slots extending through the walls of said shafts thereby, forming passages to the interior of said shafts, said second hub having an extension extending sldable through an opening in the end wall of said inclosure in adjacency to said pulleys at each of said shafts, each said opening supportably mounting in a seal adaptor while mounting a second seal in contact with surfaces of an external diameter of said extensions, thereby providing a part of said drive means being disposed in the inclosure, said shafts having bores extending to said passages for operably engaging corresponding external surfaces of a first rack and its head and a second rack and its head, said racks having gear teeth beyond said heads, and being arranged in pairs within each of said bores with the respective gear teeth in mesh oppositely with a gear pinion and with said heads disposed oppositely beyond said pinion, said pinion being journally supported by its shaft pin, which is fixedly attached in the walls of said bore in alignment to said slots intermediate of said passages, said heads having plane surfaces to provide of the oppositely disposed end portion of said racks to telescopically bypass said heads, said second rack of each pair being fixedly connected to said second hub by a pin extending transversely through the walls of said extension, said second pair of slots and the head of said second rack, and said first rack of each pair being fixedly connected to said first hub by a pin extending transversely through the walls of said first hub within said engagement, said first pair of slots and the head of said first rack at each shaft, so that upon causing an axial movement of said second hub causes corresponding movement of said second rack, which causes a rotative movement of said pinion and substantially a corresponding axial movement of said first hub oppositely, thereby controlling said effective diameters, within said inclosure each of said extensions mounting fixedly a thrust bearing, said thrust bearing being fixedly mounted within a casing, externally said casing operably mounting a control roller, said control roller at each shaft being disposed to extend into a curved groove at each end of a control nut, said nut having internal screw threads and mounted slidably onto a guide rod means intermediate of said shafts, said curved grooves being inclined oppposedly, whereby the side walls of said grooves forms a sloped curved track for its respective roller, so that causing a transverse movement of said nut, causes one of said rollers to move toward said V-belt while simultaneously the other roller is caused to move a correlative amount oppositely, thereby causing said axial adjustment while maintaining said drive relationship, a lead screw, said lead screw extending threadingly through said nut and being journally supported for rotation while being fixed against endwise movement, so that causing a rotative actuation of the lead screw causes said transverse movement, outwardly beyond said inclosure said lead screw mounting means for effecting said rotative actuation, and through the range of said axial adjustment the edges of said pins extending transversely through the walls of said extensions being disposed so as to remain within said inclosure, while the edges of the pins extending transversely through the walls of said first hubs remains within said engagement, thereby maintaining the respective contact of said first and second seals with the respective surfaces of said hubs, a fluid lubricant within said inclosure, a fluid propulsion means mounted operably connected to at least one of said shafts, said propulsion means extending to said fluid so that upon operation of said mechanism it causes part of said fluid being propelled above the normal level of the fluid pool within the inclosure, thereby causing fluid wetting of surfaces of the control means and said extensions therein said inclosure by part of said propelled fluid.

4. The invention according to claim 3, wherein coaxial relative to said shaft pin each said pinion has a pair of projections of diameter to coincide with the root diameter of its gear teeth, said projections including spherical ends substantially of diameter of said bores, each of said racks having a pair of notches disposed to correspond with the diameter and length of said projections, whereby upon said racks and pinions within the bores when in telescopic position forms, a series of channels extending from opposite end of said heads spaced from said passages on the perimeter of said bores, thereby providing fluid channels within said bores, an orifice, said orifice having an open end disposed within said inclosure above the center of at least one of said shafts and arranged to receive a part of said propelled fluid, a four part inclosed apertured means arranged in series for conveyance of said fluid from said orifice to the metal to metal actuating parts of said mechanism beyond said inclosure and return of the excess fluid into said inclosure comprising, a first part, said first part extending from said orifice within said inclosure to and into an end of said first shaft disposed beyond the inclosure and to, a second part, said second part being disposed within said first shaft and extending axially therein to, a third part, said third part being disposed beyond said inclosure and extending from an end of said first shaft to an end of said second shaft and to, a fourth part, said fourth part extending axially therein said second shaft to a free discharge opening disposed within said inclosure, said opening providing said excess fluid returning to said fluid pool, said second and fourth parts include said channels and said passages, thereby providing of said propelled fluid wetting of surfaces of said drive means, said racks and said pinions and said engagement in a continual manner mechanically upon causing said operation.

5. The invention according to claim 3, wherein said pair of splines has a transverse width whereby said shaft pin remains within the range of said width while extending therethrough, and said shaft pin having substantially an external surface of uniform diameter.

6. In a variable ratio transmission mechanism having a housing, said housing operably mounting means for a speed change gearing and a drive motor, a pair of shafts in spaced parallel relationship, variable effective diameter pulleys mounted in cooperative positions on said shafts, each of said pulleys comprising a pair of sections having opposed inclined belt engaging faces, forming by axial adjustment variable effective diameters, for an endless V-belt in active driving relationship to said pulleys, control means for mechanically varying said ratio: internally near one end at least one of said shafts having a shoulder means, said end having a taper bore with a corresponding tapered split bushing extending therein, an internal keyway, said internal keyway extending from said end through said taper bore, said tapered split bushing having a straight bore conforming to the diameter of the shank of a pinion shaft, an external keyway within said shank, said pinion shaft having a head with surface means corresponding to and engaging said shoulder means, with said shank extending therefrom to and beyond said end, with a key within said internal and external keyways, said shank in adjacency to the large end of said bushing mounting a first pinion gear of said speed change gearing, and beyond said pinion the free end of said shank being provided with a lock nut means, whereby upon tightening up of said lock nut means causes wedging of said tapered bushing into said taper bore and seizing of said shank in adjacency of said pinion, by simultaneously causing a pressing of said pinion against said end of said bushing and said engaging of the surface means with the shoulder means, and said key forming drive means between said pinion shaft and said shaft end.

7. In a variable ratio transmission mechanism including a housing, said housing having a fluid inclosure and operably mounting means for a pair of tubular shafts in spaced parallel relationship, a speed change gearing, a motor, an orifice with an opening within said inclosure disposed above the center of one of said shafts, said motor drivingly connected to one of said shafts, a fluid lubricant within said inclosure extending to said speed change gearing, a fluid propulsion means operably connected to at least one of said shafts and extending to said fluid, whereby upon operation of said mechanism causes part of said fluid being propelled above the normal level of the fluid pool within said inclosure to said opening, variable effective diameter pulleys mounted in opposed cooperative positions on said shafts, each of said pulleys comprising a pair of sections having opposed inclined belt engaging faces externally beyond said inclosure, forming by relative axial adjustment variable effective diameters, for an endless V-belt in active driving relationship to said pulleys, spline means, said spline means forming slidable engagement between said shafts and hub members of said sections, a consecutive series of inclosed apertured means arranged and extended beyond said inclosure for causing in a continual manner conveyance of said fluid from said orifice to said engagement at each of said shafts and return of the excess fluid to a free return within said inclosure mechanically upon causing said operation: internally near one end, at least one of said shafts having a shoulder means, said end having a taper bore with a corresponding tapered split bushing extending therein, an internal keyway, said keyway extending from said end through said taper bore to an aperture extending through the wall of said tubular shaft, said tapered split bushing having a straight bore conforming to the diameter of the shank of a pinion shaft, an external keyway within said shank, said pinion shaft having a head with surface means corresponding to and engaging said shoulder means, with said shank extending therefrom to and beyond said end, with a key within said internal and external keyways, said shank in adjacency to the larger end of said bushing mounting a first pinion gear of said speed change gearing, and beyond said pinion the free end of said shank being provided with a lock nut means, whereby upon tightening up of said lock nut means causes wedging of said tapered bushing into said taper bore and seizing of said shank in adjacency to said pinion, by simultaneously causing pressing of said pinion against said end of said bushing and said engaging of the surface means therewith the shoulder means, and said key forming drive means between said pinion shaft and said shaft end, and said head having a plane surface extending parallel to the longitudinal axis of said shafts, said surface providing a bypass passage beyond said head for said fluid and, together with said angular aperture forming said free return.

8. The invention according to claim 1, wherein the pitch diameter of the curve of said curved groove constitutes a segment of a true circle and, in which the diameter is provided by a right triangle formed by the length of the total of said axial adjustment and the length of the total of said transverse movement and in which the hypotenuse of said triangle represents the chord of said segment and, in which the distance of axial adjustment from the small effective diameter to the mid effective diameter positions of said pulleys relative to the mid length of said transverse movement forms a third point of said pitch diameter beyond said hypotenuse toward said pulleys, of which the length of said chord relative to said third point forms means for computing said pitch diameter, and the direction of said transverse movement relative to the axis of said indicator stem being parallel.

9. In a variable ratio transmission and a speed change gearing, said speed change gearing having a power input shaft, internally spaced from one end said input shaft having a shoulder means, said end having a taper bore with a corresponding tapered split bushing extending therein, said tapered bushing having a straight bore conforming to the diameter of the shank of a pinion shaft, said pinion shaft having a head with surface means corresponding to and for operably engaging said shoulder means, with said shank extending therefrom to and beyond said end, said shank in adjacency to the large end of said bushing mounting a first pinion gear of said speed change gearing, and beyond said first gear the free end of said shank being provided with a lock nut means, whereby tightening up of said lock nut means causes wedging of said tapered bushing into said taper bore and seizing of said shank in adjacency to said first gear, by simultaneously causing a pressing of said first gear against said end of said bushing and said operably engaging of the surface means with the shoulder means.

10. In a variable ratio transmission mechanism including a housing, said housing having an operable mounting means for a motor and a first shaft and a second shaft in spaced parallel relationship, variable effective diameter pulleys mounted in cooperative positions on said shafts, in which the pulley on said first shaft is operably connected to a thrust bearing within a first casing and the pulley on the second shaft is operably connected to a thrust bearing within a second casing, each of said pulleys comprising a pair of sections having opposed inclined belt engaging faces and forming, by relative axial adjustments of said first and second casing variable effective diameters, for an endless V-belt in active driving relation to said pulleys, control means for mechanically varying said ratio, a portion of said control means being disposed in adjacency to an end of at least one of said pulleys, with linkage means operably attached thereto while extending between said control means portion and said first and second casings with a reactance means and an indicator means operably combined therewith, said reactance means including a resilient means, a mounting means, a pivotal support for said mounting means, said resilient means being operably mounted by said mounting means and being confined between said pivotal support and surface means on said first and second casing in flexed position thereby producing a force urging said first and second casings toward said belt simultaneously, said pivotal support being disposed intermediate of said first and second shafts as a part of said control means, so that upon actuation of said control means said mounting means pivots about said pivotal support while substantially maintaining said force, and in which simultaneously said indicator means indicates a speed ratio of said mechanism, by means forming an operating connection between said control means and said indicator means, and said pivotal support disposed within said housing, whereby said housing provides anchorage for said pivotal support.

11. The invention according to claim 10, wherein at least one of said shafts has a bore with a gear pinion mounted therein and a pair of oppositely disposed racks in mesh with said pinion, said pinion and racks forming a part of said linkage means and in which said pinion has a pair of projections of diameter to substantially coincide with the root diameter of its gear teeth, and each of said racks having a pair of notches disposed to correspond with the diameter and length of said projections on the perimeter of said bore.

12. In a variable ratio transmission mechanism including a housing, said housing having an operable mounting means for a motor and a first shaft and a second shaft in spaced parallel relationship, variable effective diameter pulleys mounted in cooperative positions on said shafts in which the pulley on said first shaft is operably connected to a thrust bearing within a first casing and the pulley on the second shaft is operably connected to a thrust bearing within a second casing, each of said pulleys comprising a pair of sections having opposed inclined belt engaging faces and forming, by relative axial adjustments of said first and second casing variable effective diameters, for an endless V-belt in active driving relation to said pulleys, control means for mechanically varying said ratio, a portion of said control means being disposed in adjacency to an end of at least one of said pulleys, with linkage means operably attached thereto while extending between said control means portion and said first and second casing with a reactance means operably combined therewith, said reactance means including a resilient means, a mounting means, a pivotal support for said mounting means, said resilient means being operably mounted by said mounting means and confined between said pivotal support and surface means on said first and second casings in flexed position thereby producing a force urging said first and second casings toward said belt simultaneously, said pivotal support being disposed intermediate of said first and second shafts as a part of said control means, so that upon actuation of said control means said mounting means pivots about said pivotal support while substantially maintaining said force, and said pivotal support and said casings disposed within said housing, whereby said housing provides anchorage for said pivotal support.

References Cited in the file of this patent

UNITED STATES PATENTS

| | | |
|---|---|---|
| 2,637,215 | Rieser | May 5, 1953 |
| 2,797,590 | Reeves | July 2, 1957 |
| 2,799,176 | Rieser | July 16, 1957 |